Jan. 7, 1958　　F. M. LANKFORD　　2,819,131
SLUSH PUMP PISTONS
Filed May 9, 1955
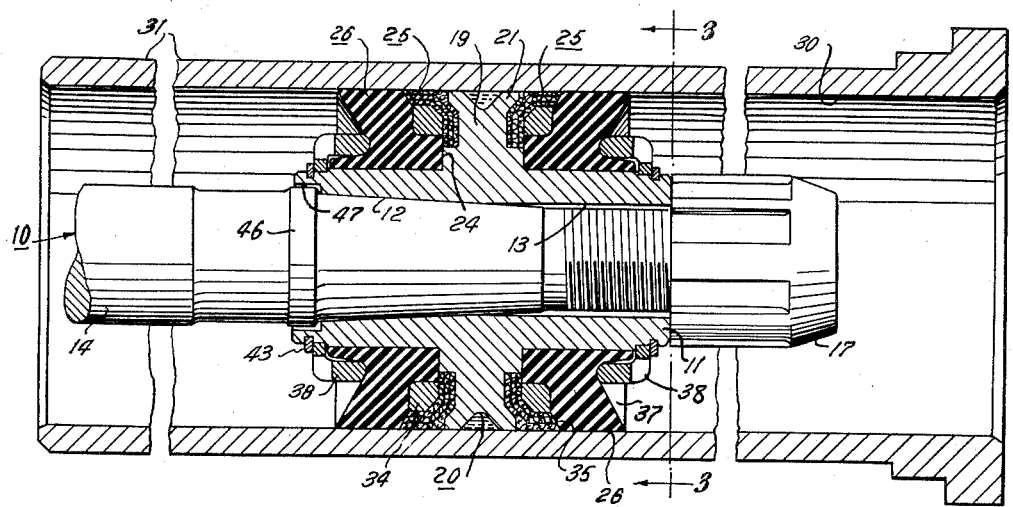
Fig. 1
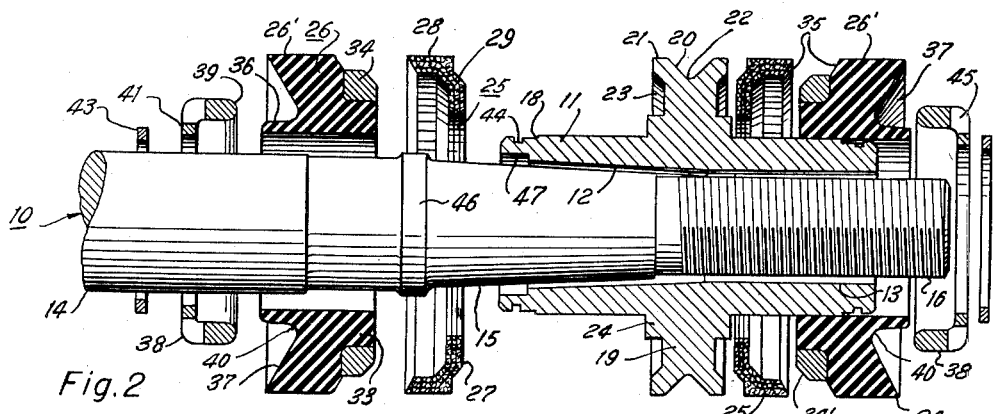
Fig. 2
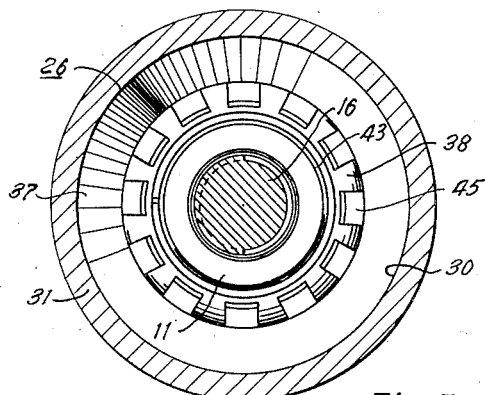
Fig. 3
Fig. 4
INVENTOR.
Francis M. Lankford
BY Ashley & Ashley
ATTORNEYS United States Patent Office 2,819,131
Patented Jan. 7, 1958

2,819,131

SLUSH PUMP PISTONS

Francis M. Lankford, Houston, Tex.

Application May 9, 1955, Serial No. 506,779

7 Claims. (Cl. 309—4)

This invention relates to new and useful improvements in slush pump pistons.

One object of the invention is to provide an improved slush pump piston having elastic packing rings separate from and seated in semi-rigid cups on a piston body, whereby stripping back of the rings is minimized and more efficient pumping is had.

An important object of the invention is to provide an improved slush pump piston having elastic packing rings separate from and seated in semi-rigid cups on a piston body with a metallic constriction ring interposed between each cup and its elastic ring in such a manner as to prevent the elastic ring from placing undue pressure on the heel of the cup and so as to force said elastic ring to exert its pressure on the lip of said cup, as well as to confine the base of said elastic ring against undue radial expansion.

A further object of the invention is to provide an improved piston having elastic packing rings seated in semi-rigid cups on a piston body with each cup being seated in an annular flange extending from a circumferential base surrounding a body on which the annular base of each packing ring is snugly mounted whereby each ring base abuts the adjacent cup and the flange base, together with a metallic constriction ring confined between each cup and its correlated elastic ring so as to surround the elastic ring-base and stabilize undue radial expansion and prevent harmful distortion.

An object of the invention is to provide an improved piston having elastic packing rings seated in semi-rigid cups on a piston body, wherein the rings have internal annular lips surrounding the body and circumferential cages on said body overhang the lips to securely confine said rings and cups and permit sealing engagement of said lips with said body by pressure fluid.

A construction designed to carry out the invention will be hereinafter described, together with other features of the invention.

The invention will be more readily understood from a reading of the following specification and by reference to the accompanying drawing, wherein an example of the invention is shown, and wherein:

Fig. 1 is a longitudinal sectional view of a slush pump piston constructed in accordance with the invention and mounted in a pump liner, Fig. 2 is an exploded longitudinal sectional view of the piston, Fig. 3 is a transverse, vertical, sectional view, taken on the line 3—3 of Fig. 1, and Fig. 4 is an enlarged, sectional view of a portion of one of the cups to show the details of its construction.

In the drawings, the numeral 10 designates a slush pump piston which includes a tubular or cylindrical body 11 having an inwardly-tapered bore 12 extending throughout the major portion of its length and merging into a cylindrical counterbore 13 at one end of the body. A piston rod 14, having a tapered shank 15 terminating in a cylindrical stud 16, is driven into the bore 12 so that its shank frictionally engages therein and the stud is partially surrounded by the counterbore 13. Being of a larger internal diameter, the counterbore is spaced slightly from the stud. The body 11 is tightly secured on the shank 15 by a suitable nut 17 screw-threaded on the stud 16 and engaging the adjacent end of the body.

The body 11 has a substantially uniform external diameter throughout its length except at its ends which are reduced and shouldered at 18, while an external, circumferential flange 19 is made integral with its central portion. An annular groove or recess 20 is formed medially in the exterior of the flange and is flared outwardly to form a circumferential pocket 22. Outwardly-facing, annular sockets 23 are formed in each side of the flange 19 and flaring lips 21, forming the sides of the pocket, overhang the sockets. The flange includes a cylindrical shoulder or base 24 surrounding the body 11 and of greater width than said flange so as to form the inner annular walls of the sockets 23.

Separate and distinct annular, reinforcing cups 25 and annular piston packings or rings 26 surround the base 24 and the body 11, respectively. Each cup has an annular bottom 27 which snugly engages around the ends of the cylindrical base 24 and is firmly seated in one of the sockets 23. A peripheral lip 28 extends at substantially a right angle to the bottom 27 and is integrally connected thereto by an inclined web 29 which underlies the adjacent flaring lip 21 of the flange 19. The inner end of each ring lip abuts the end of the adjacent flange lip and the outer cylindrical face or rim 26' of each ring on each side of the flange is exposed for engagement with the bore 30 of a liner 31. As shown in Fig. 4, the cups 25 are formed of annular layers or rings 32 of fabric, preferably woven, bonded together or vulcanized by synthetic rubber or other suitable, oil-resistant material.

Each ring 26 is made of synthetic rubber or other suitable elastic, oil-resistant material and is generally angular in cross-section. The shape of each ring 26 is such that it snugly engages its component cup and is provided with an internal, annular base or shoe 33 which abuts both the adjacent end of the base 24 and the bottom 27 of the correlated cup. While the bore of each ring snugly engages around the body 11, its outer cylindrical face engages the bore 30 of the liner. A metal constraining ring 34 encircles each shoe 33 and has a beveled face 34' fitting against the inclined web 29 of the adjacent cup 25 and is bonded to the adjacent ring 26. Beveled or inclined contact surfaces 35 are provided between the adjacent ends of each ring 26 and the lip 28 of the cup and extend outwardly from the interposed constraining ring toward the outer end of the piston.

Each elastic ring 26 has an internal, annular lip 36 at its outer end of such diameter as to snugly engage the body 11 and to seal thereagainst under the action of pressure fluid. An outwardly flared face 37 surrounds and overhangs the lip. For holding the ring and cup assemblies in place, an annular retaining cage 38 angular in cross-section, surrounds each lip 36 and has an inwardly-directed, annular nose or flange 39 which engages a fillet 40 between said lip and the face 37. Each cage has an internal, annular seat 41 which engages the shoulder 18 at each end of the body and is held in place by a split, resilient, retaining ring 43 seated in an annular groove 44 in the reduced end of said body. The proportions and contacts of the various elements, which have been previously described are such that, when the rings 43 are snapped into the grooves 44, said elements are securely held in place. The retaining cages have suitable openings 45 spaced circumferentially therearound to permit the pressure of the fluid to uniformly contact the lips 36. An annular shoulder 46 at the inner end of the tapered shank 15 of the piston rod 14 may be received in a counterbore 47 at the end of the bore 12. The stud 16 is partly housed in the body bore and the nut 17 is tightened against the outer end of the body sufficiently to force said body tightly on the shank. The pocket 22 may be filled with a suitable lubricant and may serve as trap for debris.

The structure, arrangement and relation of each cup and its packing ring, with respect to each other and to the cylinder wall, are of particular importance. While the rings are each fully elastic, each cup is far from such elasticity and, while yieldable and pliable, possesses sufficient rigidity to adequately perform its function. As will be explained, the cups and rings include novel features which distinguish this invention from the prior art and mark its advance in the field. Each cup, as hereinbefore pointed out, is composed of fabric layers or rings 32 bonded together or vulcanized by synthetic rubber or other suitable oil-resistant material. It is noted that it is preferable, and essential for the best results, to compose each cup predominantly of layers of fabric or other pliable reinforcing material in such close order or relation as to dominate the structure and to employ the rubber as a bonding agent. Such a combination of materials gives each cup a non-elastic, semi-rigid construction.

Of considerable importance is the particular structure of each cup. The cup has its annular, flat bottom 27 firmly seated in the socket 23 and snugly engaged around the base 24 to provide a firm mounting. The peripheral lip 28 has a relatively broad perimeter which provides a constant cylindrical wall contact of sufficient surface area to defeat the tendency of the elastic ring 26 to roll or strip back between the cylinder wall and cup. This is augmented by the flaring lips 21 which receive the end thrusts of the cups against the flange 19 and by the inclined contact surfaces 35 between each cup and ring. The constraining ring 34, in conjunction with the base 24, prevents the elastic ring 26 from placing undue pressure on the heel or inner margin of the cup bottom and forces said elastic ring to exert its pressure on the cup lip. Further, the constraining ring acts to maintain the elastic ring in sealing engagement with the body 11 and prevents radial expansion of the annular shoe 33 of said ring and consequent excessive radial expansion of the cup lip 28.

The retaining cage 38 holds the cup 25, constraining ring 34 and elastic ring 26 in firm engagement with said cup and ring 26 in sealing engagement with the flange and base 24. The face 37 of the elastic ring is unobstructed so that said ring may undergo distortion under the action of pressure fluid, since the cage confines only the inner margin of said ring. The shoe 33 and lip 36 and that portion of each elastic ring connecting these elements may be referred to as a base portion. This application is in some respects an improvement upon my co-pending application filed August 31, 1953, Serial No. 377,586, now abandoned.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A pump piston including a cylindrical body, a medial annular flange having a base surrounding the body, annular cups surrounding the body on each side of the flange and outwardly of the base, separate and distinct packing rings surrounding the body and seated outwardly against the base and the cups, retaining means engaging around the rings and body, and an annular constraining ring interposed between each cup and its packing ring.

2. A pump piston including a cylindrical body, a medial flange directed outwardly from the body, annular cups surrounding the body and seated against each side of the flange and having circumferential rim portions, separate and distinct annular elastic rings abutting the cups and having exposed circumferential surfaces, annular lips extending from the rings and overlying said body, retaining means engaged around said body and overhanging the lips to hold said rings on said body, and an annular constriction ring interposed between each cup and its elastic ring.

3. A pump piston including an elongated body, a medial enlargement surrounding the body, annular cups of semi-rigid material surrounding the body on each side of the enlargement and having cylindrical exterior walls, annular rings of elastic material surrounding said body, each ring having ring having an enlarged base portion engaging said body with one end within its cup and an outer end proving a sealing lip, retaining means engaging around the body and overhanging the lip, and an annular constriction ring interposed between each cup and its elastic ring and confining the inner end of the base portion of said elastic ring.

4. A pump piston including an elongated body, a medial enlargement surrounding the body, annular cups of semi-rigid material surrounding said body on each side of the enlargement and having cylindrical exterior walls, annular rings of elastic material surrounding said body, each ring having a laterally projecting base portion engaging said body with one end within its cup and an outer end providing a lip, a retaining cage surrounding the body and overhanging the lip of the base portion, and an annular constriction ring interposed between each cup and its elastic ring and confining the inner end of the base portion of said elastic ring.

5. A pump piston including an elongated cylindrical body, a circumferential flange surrounding the central portion of the body and having an annular socket on each side, a circular base surrounding said body at the inner portion of the flange, annular cups of semi-rigid material mounted on the ends of the base and seated in the sockets of the flange, annular elastic rings surrounding the body and having base portions abutting the cups and the base of the flange, lips at the outer ends of the ring base portions, the rings having outwardly flaring portions engaging the outer portions of the cups, circumferential cages secured around the ends of the body and overhanging the lips to confine said rings, and an annular constriction ring interposed between each cup and its elastic ring and confining the inner end of the base portion of said elastic ring.

6. As a sub-combination in a pump piston, an elastic ring having an annular base protruding at one end to form a shoe and protruding at its opposite end to form a lip, the ring having an outwardly flaring surface and a cylindrical periphery overhanging the lip, a rigid constraining ring encircling the annular shoe and spaced from the periphery of said elastic ring, and an annular cup of semi-rigid material surrounding the constraining ring, the cup and elastic ring being of substantially the same external diameter and having abutting peripheral portions.

7. As a sub-combination in a pump piston, an elastic ring having an annular base protruding at one end to form a shoe and protruding at its opposite end to form a lip, the elastic ring having an outwardly flaring surface and a cylindrical periphery overhanging the lip, and a rigid constraining ring encircling the annular shoe and spaced inwardly from the outer periphery of said elastic ring.

References Cited in the file of this patent

UNITED STATES PATENTS

| | | |
|---|---|---|
| 1,816,516 | Clement | July 28, 1931 |
| 1,955,157 | Wayne | Apr. 17, 1934 |
| 2,051,262 | MacClatchie | Aug. 18, 1936 |
| 2,306,800 | Caldwell | Dec. 29, 1942 |
| 2,315,944 | Dick | Apr. 6, 1943 |
| 2,443,110 | MacClatchie | June 8, 1948 |
| 2,566,994 | Phipps | Sept. 4, 1951 |
| 2,596,703 | Maier | May 13, 1952 |
| 2,597,829 | Stillwagon | May 20, 1952 |